(12) United States Patent
Albrecht et al.

(10) Patent No.: US 11,878,571 B2
(45) Date of Patent: Jan. 23, 2024

(54) METHOD FOR OPERATING AN AIR-CONDITIONING SYSTEM FOR A VEHICLE

(71) Applicant: VOLKSWAGEN AKTIENGESELLSCHAFT, Wolfsburg (DE)

(72) Inventors: Jan-Christoph Albrecht, Wolfsburg (DE); Jochen Westhäuser, Braunschweig (DE); Carsten Wachsmuth, Schwülper (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 112 days.

(21) Appl. No.: 17/414,880

(22) PCT Filed: Dec. 16, 2019

(86) PCT No.: PCT/EP2019/085253
§ 371 (c)(1),
(2) Date: Jun. 16, 2021

(87) PCT Pub. No.: WO2020/126982
PCT Pub. Date: Jun. 25, 2020

(65) Prior Publication Data
US 2022/0055453 A1 Feb. 24, 2022

(30) Foreign Application Priority Data
Dec. 17, 2018 (DE) .................... 10 2018 132 423.5

(51) Int. Cl.
*B60H 1/32* (2006.01)
*B60H 1/00* (2006.01)
*B60H 1/22* (2006.01)

(52) U.S. Cl.
CPC ......... *B60H 1/3213* (2013.01); *B60H 1/0073* (2019.05); *B60H 1/00385* (2013.01);
(Continued)

(58) Field of Classification Search
CPC .............. B60H 1/3213; B60H 1/00385; B60H 1/0072; B60H 1/2225; B60H 1/321;
(Continued)

(56) References Cited

U.S. PATENT DOCUMENTS

2011/0016896 A1   1/2011 Oomura et al.
2014/0069123 A1   3/2014 Kim
(Continued)

FOREIGN PATENT DOCUMENTS

DE        10 230440 A1    1/2004
DE  10 2010 020 321 A1   11/2011
(Continued)

OTHER PUBLICATIONS

International Search Report of PCT Application No. PCT/EP2019/085253, dated May 4, 2020

*Primary Examiner* — Emmanuel E Duke
(74) *Attorney, Agent, or Firm* — PEARL COHEN ZEDEK LATZER BARATZ LLP

(57) ABSTRACT

The invention relates to a method for operating a climate-control system (12) for a vehicle (10). According to the invention, total energy efficiencies are determined for a group of operating strategies for the air-conditioning system (12) and an operating strategy with the greatest total efficiency that fulfills the heating output requirement (44) that has been determined, is selected.

10 Claims, 3 Drawing Sheets

(52) U.S. Cl.
CPC ........... *B60H 1/2225* (2013.01); *B60H 1/321* (2013.01); *B60H 2001/00961* (2019.05); *B60H 2001/225* (2013.01); *B60H 2001/2265* (2013.01)

(58) Field of Classification Search
CPC .............. B60H 1/00899; B60H 1/2218; B60H 2001/00961; B60H 2001/225; B60H 2001/2265
See application file for complete search history.

(56) References Cited

U.S. PATENT DOCUMENTS

| | | |
|---|---|---|
| 2016/0084554 A1 | 3/2016 | Suzuki et al. |
| 2018/0354343 A1 | 12/2018 | Suzuki et al. |

FOREIGN PATENT DOCUMENTS

| | | | | |
|---|---|---|---|---|
| DE | 102010020321 A1 | * | 11/2011 | ......... B60H 1/00392 |
| DE | 10 2011 051 285 A1 | | 12/2012 | |
| DE | 10 2012 109 483 A1 | | 6/2014 | |
| DE | 112013005367 T5 | * | 7/2015 | ......... B60H 1/00921 |
| DE | 11 2014 002 644 T5 | | 2/2016 | |
| DE | 10 2017 104 646 A1 | | 9/2017 | |
| DE | 11 2016 003 261 T5 | | 4/2018 | |
| DE | 10 2017 206 135 A1 | | 10/2018 | |
| DE | 102017206135 A1 | * | 10/2018 | ......... B60H 1/00392 |
| FR | 3 026 172 A1 | | 3/2016 | |

* cited by examiner

METHOD FOR OPERATING AN AIR-CONDITIONING SYSTEM FOR A VEHICLE

CROSS-REFERENCE TO RELATED APPLICATIONS

This application is a National Phase Application of PCT International Application No. PCT/EP2019/085253, International Filing Date Dec. 16, 2019, claiming priority of German Patent Application No. 10 2018 132 423.5, filed Dec. 17, 2018, which is hereby incorporated by reference.

FIELD OF THE INVENTION

The invention relates to a method for operating a climate-control system for a vehicle, to a control unit and to a motor vehicle.

BACKGROUND OF THE INVENTION

Heat exchangers find widespread use in the automotive sector, for example, in motor vehicles, for purposes of the climate-control of the vehicle. In this function, it is a known procedure to provide heat exchangers as part of a heat pump by means of which heat is extracted from the outside air for the climate-control of the vehicle. This concept is especially well-suited for electric vehicles in order to extend the driving range as compared to those that use electric heating.

However, such heat pumps entail the problem that, when the outdoor temperatures are low, for example, −4° C. or less, the heat exchanger tends to ice up since said heat exchanger has to be very cold in order to reach the temperature differential that is needed for the heat exchange. As a result, the heat exchanger has to be thawed after some time, and this, in turn, can be very energy-intensive. However, this is a conventional but necessary procedure in order to remove the ice build-up that detrimentally affects the efficiency of the heat exchange.

German patent application DE 10 2012 109 483 A1 discloses a method for regulating an energy supply system. Here, a determination is made as to which control variables from among a plurality of control variables permit a more energy-efficient regulation of a heat transfer medium. In this context, to start with, a heat exchange process is regulated on the basis of the control variable that has been determined as being more energy-efficient. The control variable that has been determined as not being more energy-efficient is then only used to regulate the heat exchange if the regulation objective cannot be achieved only with the control variable that has been determined as being more energy-efficient.

SUMMARY OF THE INVENTION

Before this backdrop, the invention is based on the objective of finding a technical solution which prevents the climate control of a vehicle from being carried out during unfavorable operating states.

The objective is achieved by means of the subject matters of the independent claims. Further preferred embodiments of the invention ensue from the other features put forward in the subordinate claims.

A first aspect of the invention relates to a method for operating a climate-control system for a vehicle, whereby the climate-control system comprises:
a heat pump with an outside-air heat exchanger; and
an additional heating heat source for an interior of the vehicle; whereby the method comprises the following steps:

determining a heating output demand for the climate-control of the vehicle;
determining a thus required heat output uptake at the outside-air heat exchanger;
determining an outside-air state;
determining a fluid temperature in the outside-air heat exchanger that is needed for the required heat output uptake;
determining whether the value of the required fluid temperature falls below a dew point of the outside air at the outside-air heat exchanger; and then
selecting an operating strategy for the climate-control system from a group that comprises at least the following operating strategies:

b) meeting part of the heating output demand by operating the heat pump at a fluid temperature whose value does not fall below the dew point, and meeting the rest of the heating output demand by operating the additional heating heat source;

d) temporarily meeting the heating output demand by operating the heat pump at a fluid temperature whose value falls below the dew point, followed by a thawing phase of the outside-air heat exchanger;

whereby the selection of the operating strategy is made on the basis of criteria that comprise at least meeting the heating output demand and maximizing the overall efficiency of the climate-control system.

In other words, the total energy efficiencies for the operating strategies comprised by the group of strategies are determined and the operating strategy with the greatest total efficiency that meets the heating output demand is selected.

Since the operating strategy is selected in this manner, this advantageously ensures that the heating output demand is met and, by coordinating the use of the available heat sources with each other, namely, the outside air and the additional heat source, the climate-control system can always be operated within the range having the greatest efficiency. This is also especially achieved in that it is possible to combine, for example, the operation of the heat pump under icing conditions with the operation of an electric heating heat source which, each taken on their own, can have a favorable efficiency. The important aspect here is that these combinations balance each other out in terms of the total efficiency over the course of the method. Therefore, under certain conditions, a total efficiency can be achieved that is above the achievable total efficiency that would be the case, for example, if only the heat pump or only the additional heating heat source were to be used to meet the heating output demand.

The term "total energy efficiency" in conjunction with the invention refers to the ratio of the uptake of electric energy of a compressor of the heat pump to the uptake of energy of the additional heating heat source, for example, electric energy.

The heating output demand for the climate control is determined, for example, in a known manner on the basis of a target temperature and an actual temperature in the vehicle. Here, depending on the desired level of precision, additional factors such as, for example, the air volumetric capacity of the vehicle or the heat capacity of the air, can also be taken into consideration in a known manner.

In order to determine the outside air state, the temperature and humidity of the outside air, for example, are determined in a known manner and a dew point is derived from this. The relevance of the dew point in the method according to the invention lies especially in the fact that said dew point indicates whether or not ice is forming on the outside-air heat exchanger.

As far as the required fluid temperature in the outside-air heat exchanger is concerned, the person skilled in the art will recognize from the disclosed teaching, for example, that an inflow temperature of the fluid into the outside-air heat exchanger constitutes a practical reference and that its flow rate has to be taken into consideration.

The above-mentioned thawing phase of the outside-air heat exchanger can be reached by reversing the heat pumping process or else by actively or passively supplying heat, which will be discussed in greater detail below.

Preferably, the additional heating heat source employed is an electric heating heat source. It is known that electric heat sources, taken on their own, are among the less efficient heat sources, but this is advantageously balanced out and even overcompensated for in the method according to the invention by the described synergy effects.

Preferably, the climate-control system employed is intended for an electric vehicle since here, the improved energy efficiency has an especially advantageous effect on the driving range.

In a preferred embodiment of the method according to the invention, it is provided that the group comprises the following additional operating strategy: a) meeting the heating output demand by operating the heat pump at a fluid temperature whose value does not fall below the dew point.

Therefore, under suitable conditions, it is possible to resort to operating only the heat pump without running the risk of icing.

In another preferred embodiment of the method according to the invention, it is provided that the group comprises the following additional operating strategy: c) temporarily meeting part of the heating output demand by operating the heat pump at a fluid temperature whose value falls below the dew point, and meeting the rest of the heating output demand by operating the additional heating heat source, followed by a thawing phase of the outside-air heat exchanger.

In this manner, icing of the outside-air heat exchanger can be slowed down and the need for a thawing phase can be delayed.

In another preferred embodiment of the method according to the invention, it is provided that, in operating strategy c) or d), the heating output demand during the thawing phase is met by operating the additional heating heat source.

In this manner, the thawing phase is advantageously bridged and loss of comfort is avoided.

In another preferred embodiment of the method according to the invention, it is provided that heat from the additional heating heat source is used to thaw the outside-air heat exchanger.

In this manner, the thawing can advantageously also be carried out without reversing the heat pumping process. If the heat pumping process is additionally reversed, the heat from the additional heating heat source can advantageously counter the cooling effect that results from the reversal of the heat pumping process, so that perceptible fluctuations in the climate control of the vehicle are avoided.

In another preferred embodiment of the method according to the invention, it is provided that, in operating strategy c), a simulation, a predictive regulation or the use of an engine map are carried out on the basis of user information and of an icing model, whereby a determination is made as to when the heating output demand will be eliminated and then part of the heating output demand is met by operating the heat pump at a fluid temperature whose value falls below the dew point, and the rest of the heating output demand is met by operating the additional heating heat source, so that this operating strategy leads to a maximization of the total efficiency until the heating output demand is eliminated.

The user information can comprise, for example, navigation information about the duration of the heating output demand, for example, in the form of the distance that is to be driven with the vehicle, or else it can also comprise a climate-control setting. The simulation can then determine, for example, when the vehicle is going to be parked and consequently, climate control will no longer be needed. Based on this, the simulation can determine, for instance, the amount of heating output that can be provided by the heat pump under icing conditions until the heating output demand is eliminated and which amount has to be augmented by the additional heating heat source until the entire heating output demand is met, so that, for example, the highest possible total efficiency exists until the destination is reached.

The thawing of the outside-air heat exchanger can thus be shifted into a period of time during which no climate control is needed. Consequently, the thawing can also be carried out, for example, passively, by planning a resting phase of the climate-control system after use. In this manner, the icing of the outside-air heat exchanger is advantageously slowed down during the operation of the climate-control system, for example, while driving, although it is fundamentally permissible.

In another preferred embodiment of the method according to the invention, it is provided that, in operating strategy c) or d), a simulation is carried out on the basis of user information and of an icing model as to when the heating output demand will be eliminated, and the heating output demand is met until the heating output demand is eliminated in that the heat pump is operated at a fluid temperature whose value falls below the dew point.

In contrast to the embodiment of the method described above, the thawing takes place, for example, outside of the period of operation of the vehicle and can thus be carried out very slowly and efficiently or even using energy that is supplied by a charging station. In this embodiment, it is checked, for example, whether, under given conditions, icing of the outside-air heat exchanger is permissible if, for example, this nevertheless yields the highest possible total efficiency.

The efficient heat pump operation can meet the heating output demand on its own. Here, too, the thawing can be shifted into a period of time during which the climate control is no longer needed.

In another preferred embodiment of the method according to the invention, it is provided for the required heat output uptake to be updated multiple times and for the selection of the operating strategy to be thus adapted.

In this context, it can happen that the already selected operating strategy consistently meets the criteria. If not, the operating strategy can be changed. It should also be pointed out that the specification of the operating strategies from a) to d) does not imply a sequence or order but rather that the operating strategies are always being compared and that the currently most suitable operating strategy is selected on the basis of the cited criteria.

Thus, the method according to the invention makes it possible to always deploy the best operating strategy, even under changing conditions.

A second aspect of the invention relates to a control unit that is configured to carry out a method according to the preceding description.

A third aspect of the invention relates to a vehicle comprising a climate-control system with a heat pump, an outside-air heat exchanger and an additional heating heat source for an interior of the vehicle as well as comprising a control unit according to the description given above.

In particular, the vehicle can comprise the technical means described in conjunction with the method according to the invention and can have configurations of the kind disclosed in conjunction with the method according to the invention. The control unit can be configured accordingly and can comprise control software designed for the method according to the invention.

Unless otherwise indicated, the various embodiments of the invention put forward in this application can be advantageously combined with each other.

BRIEF DESCRIPTION OF THE DRAWINGS

The invention will be explained below in embodiments on the basis of the accompanying drawings. The following is shown.

DETAILED DESCRIPTION OF THE INVENTION

Figure 1:
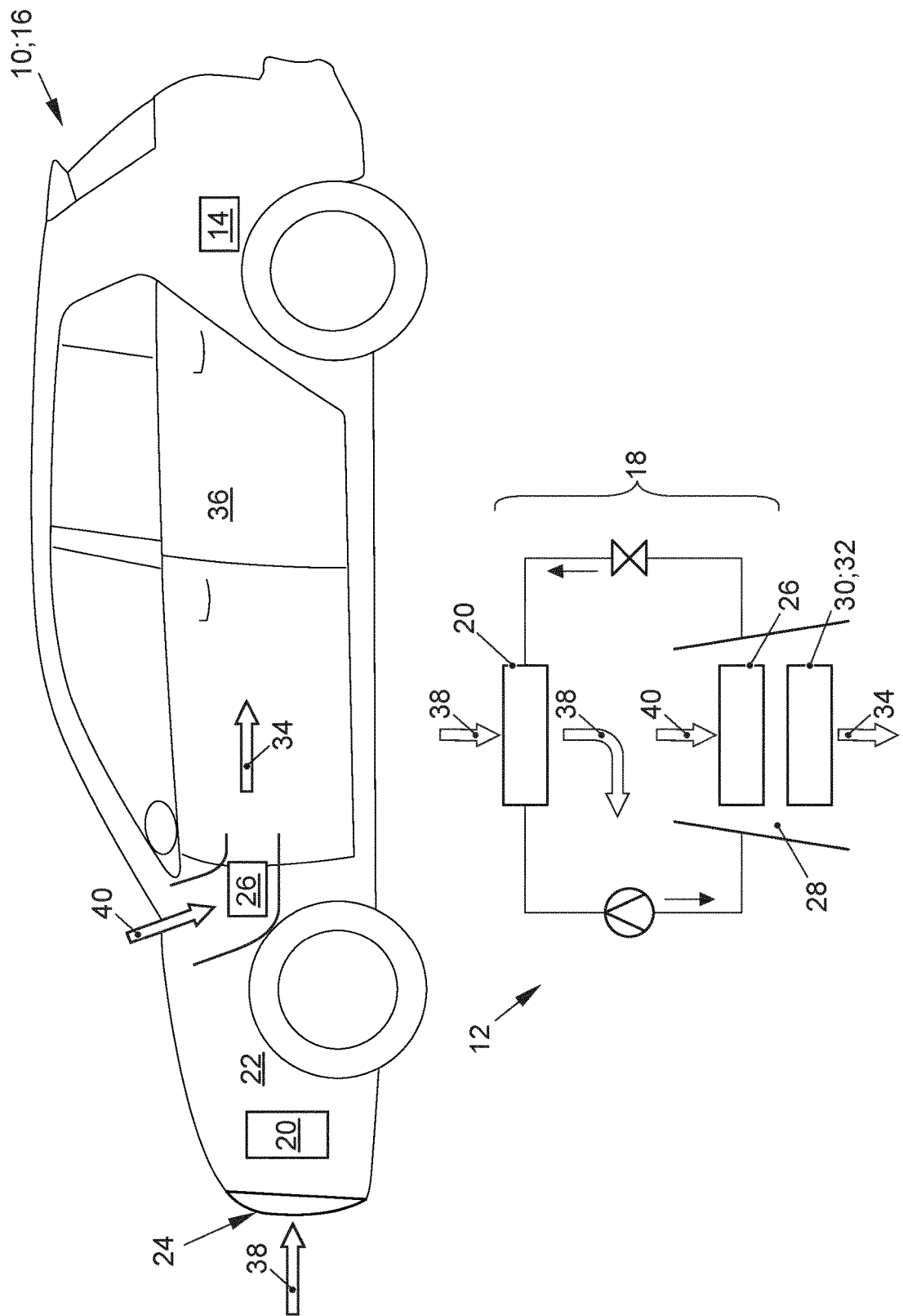
FIG. 1 a climate-control system and a control unit according to the invention in a vehicle according to the invention.

The upper part of FIG. 1 shows an embodiment by way of example of a vehicle 10 according to the invention, with a climate-control system 12 and a control unit 14 according to the invention. Here, the vehicle 10 is an electric vehicle 16.

The lower part of FIG. 1 shows the principle of the climate-control system 12.

The climate-control system 12 of the electric vehicle 16 comprises a heat pump 18. The heat pump 18 has an outside-air heat exchanger 20 that can be operated as an evaporator. The latter is arranged in a motor compartment 22 of the electric vehicle 16 behind a grille 24. Moreover, the heat pump 18 comprises an inside-air heat exchanger 26 that can be operated as a condenser/gas cooler.

The inside-air heat exchanger 26 is arranged in an outflow channel 28. The outflow channel 28 also contains an additional heating heat source 30 that, in this case, comprises an electric heating heat source 32.

Air 34 can flow into an interior 36 of the electric vehicle 16 through the outflow channel 28, said air 34 having been previously drawn in as intake air 40 from the environment or from the interior 36 of the electric vehicle 16.

Outside air 38 flows through the grille 24 into the motor compartment 22 and it is conveyed along the outside-air heat exchanger 20.

Heat contained in the outside air 38 can enter the heat pump 18 through the outside-air heat exchanger 18 and can be released as heating output to the intake air 40 via the inside-air heat exchanger 26. Furthermore, the electric heating heat source 32 can generate electric heat and can likewise release it to the intake air 40.

The control unit 14 in the electric vehicle 16 is configured to operate the climate-control system 12 in the manner according to the invention.

Figure 2:
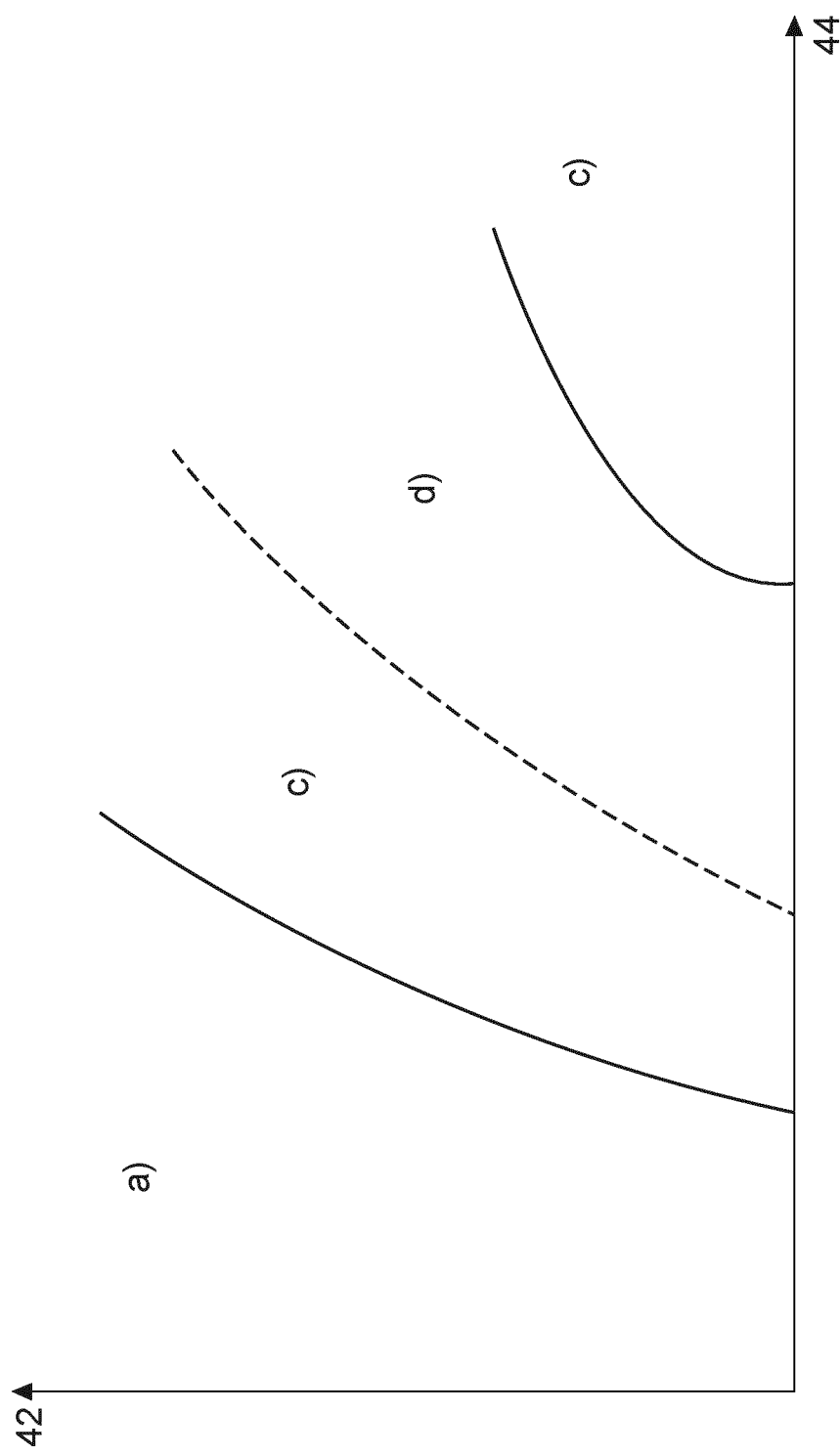
FIG. 2 a schematic depiction of the use of criteria for selecting an operating strategy.
Figure 3:
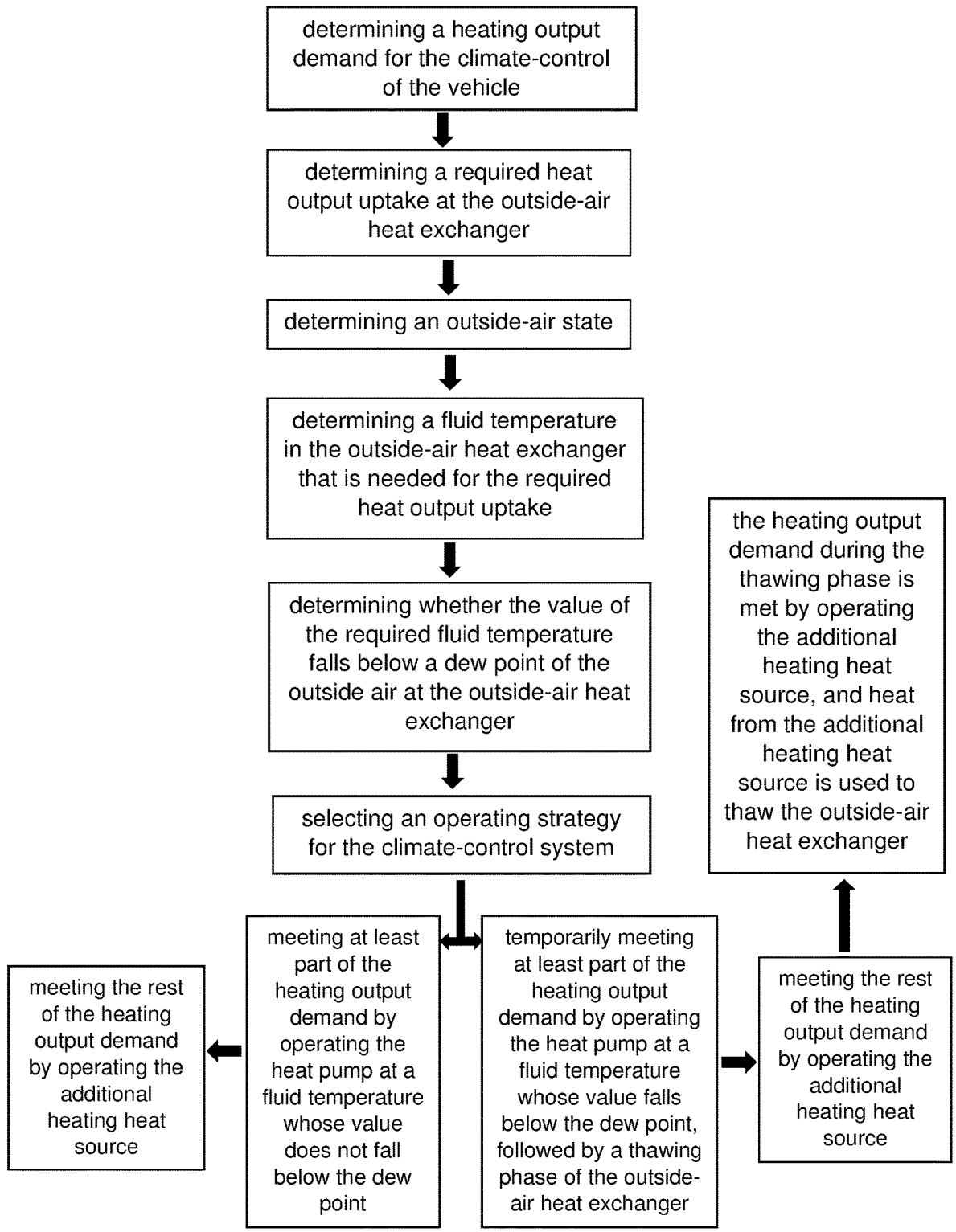
FIG. 3 a flow chart showing a method for operating a climate-control system for a vehicle, according to the present invention.

In this context, FIG. 2 shows a schematic depiction of the use of criteria for selecting an operating strategy for the climate-control system 12.

In this process, the outside air temperature 42 is plotted on the vertical axis. A heating output demand 44 is plotted on the horizontal axis.

For the sake of simplification, the target temperature in the interior 36 of the vehicle 10 is assumed to be constant. The outside air humidity as well as the flow rate of a fluid in the outside-air heat exchanger 20 are likewise assumed to be constant.

By way of example, the diagram now qualitatively shows how different operating strategies a), b), c), d) can be selected in order to cover the heating output demand 44 while also achieving the greatest possible total efficiency of the climate-control system 12.

For example, in the method according to the invention, it can be determined that these criteria within the scope of the operating strategies a) can be met purely by heat pump operation without the outside-air heat exchanger 20 icing up.

Moreover, for example, in the method according to the invention, it can be determined that these criteria within the scope of the operating strategy c) can be met by heat pump operation in combination with the operation of the electric heating heat source 32, whereby the outside-air heat exchanger 20 ices up. Operating strategy c) is shown in two areas of the diagram in FIG. 2. In the front area, closer to the vertical axis, in other words, at a lower heating output demand 44, the thawing phase takes place passively by way of example once there is no longer a demand for climate control. In the rear area, further away from the vertical axis, in other words, at a higher heating output demand 44, the thawing phase takes place by way of example by reversing the heat pumping process while meeting the rest of the heating output demand 44 with the electric heating heat source 32.

LIST OF REFERENCE NUMERALS 10 vehicle
12 climate-control system
14 control unit
16 electric vehicle
18 heat pump
20 outside-air heat exchanger
22 motor compartment
24 grille
26 inside-air heat exchanger
28 outflow channel
30 additional heating heat source
32 electric heating heat source
34 air
36 interior
38 outside air
40 intake air
42 outside temperature
44 heating output demand

The invention claimed is:

1. A method for operating a climate-control system for a vehicle, whereby the climate-control system comprises: a heat pump with an outside-air heat exchanger, and an additional heating heat source for an interior of the vehicle, the method comprises the following steps: determining a heating output demand for the climate-control of the vehicle;

determining a required heat output uptake at the outside-air heat exchanger; determining an outside-air state; determining a fluid temperature in the outside-air heat exchanger that is needed for the required heat output uptake; determining whether the value of the required fluid temperature falls below a dew point of the outside air at the outside-air heat exchanger; and selecting an operating strategy for the climate-control system from a group that comprises at least the following operating strategies: b) meeting part of the heating output demand by operating the heat pump at a fluid temperature whose value does not fall below the dew point, and meeting the rest of the heating output demand by operating the additional heating heat source; and d) temporarily meeting the heating output demand by operating the heat pump at a fluid temperature whose value falls below the dew point, followed by a thawing phase of the outside-air heat exchanger; whereby the selection of the operating strategy is made on the basis of criteria that comprise at least meeting the heating output demand and maximizing the overall efficiency of the climate-control system.

2. The method according to claim 1, wherein the group comprises the following additional operating strategy:
a) meeting the heating output demand by operating the heat pump at a fluid temperature whose value does not fall below the dew point.

3. The method according to claim 2, wherein the group comprises the following additional operating strategy:
c) temporarily meeting part of the heating output demand by operating the heat pump at a fluid temperature whose value falls below the dew point, and meeting the rest of the heating output demand by operating the additional heating heat source, followed by a thawing phase of the outside-air heat exchanger.

4. The method according to claim 3, wherein, in operating strategy c) or d), the heating output demand during the thawing phase is met by operating the additional heating heat source, and heat from the additional heating heat source is used to thaw the outside-air heat exchanger.

5. The method according to claim 3, wherein, in operating strategy c), a simulation, a predictive regulation or the use of an engine map are carried out on the basis of user information and of an icing model, whereby a determination is made as to when the heating output demand will be eliminated and then part of the heating output demand is met by operating the heat pump at a fluid temperature whose value falls below the dew point, and the rest of the heating output demand is met by operating the additional heating heat source, so that this operating strategy leads to a maximization of the total efficiency until the heating output demand is eliminated.

6. The method according to claim 3, wherein, in operating strategy c) or d), a simulation is carried out on the basis of user information and of an icing model as to when the heating output demand will be eliminated, and the heating output demand is met until the heating output demand is eliminated in that the heat pump is operated at a fluid temperature whose value falls below the dew point.

7. The method according to claim 1, wherein the additional heating heat source employed is an electric heating heat source.

8. The method according to claim 1, wherein the climate-control system employed is intended for an electric vehicle.

9. A control unit that is configured to carry out a method according to claim 1.

10. A vehicle comprising:
a climate-control system with a heat pump,
an outside-air heat exchanger,
an additional heating heat source for an interior of the vehicle, and
the control unit according to claim 9.

* * * * *